R. E. HELLMUND.
SYSTEM OF CONTROL.
APPLICATION FILED AUG. 10, 1915.
1,303,309.
Patented May 13, 1919.
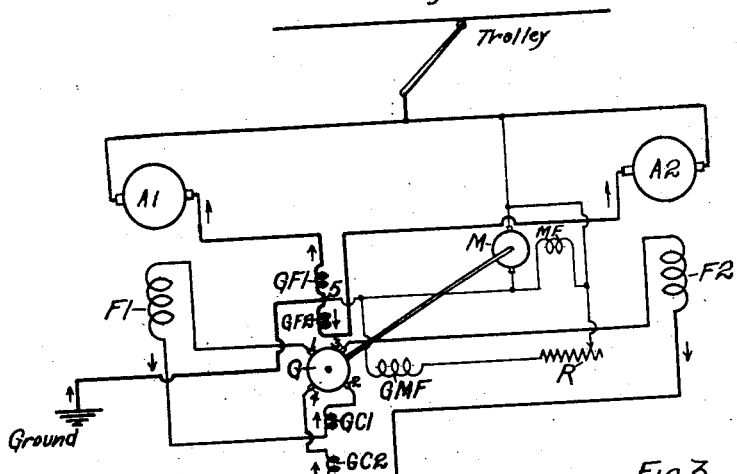
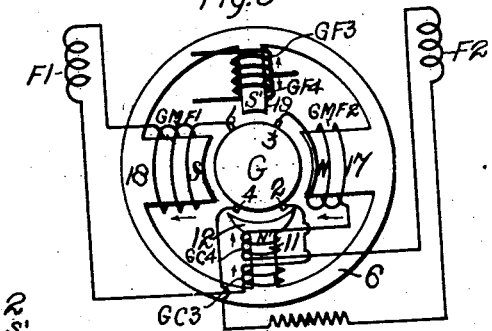
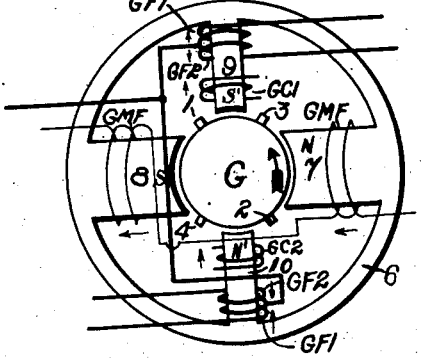
WITNESSES:
CE Myers
W. R. Coley
INVENTOR
Rudolf E. Hellmund
BY
Wesley Glenn
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,303,309.  Specification of Letters Patent.  Patented May 13, 1919.

Application filed August 10, 1915. Serial No. 44,755.

*To all whom it may concern:*

Be it known that I, RUDOLF E. HELLMUND, a citizen of the United States, and a resident of Pittsburgh, in the county of Allegheny and State of Pennsylvania, have invented a new and useful Improvement in Systems of Control, of which the following is a specification.

My invention relates to systems of control and it has special reference to the regenerative control of dynamo-electric machines that are adapted to be employed in electric railway vehicles and the like.

The object of my invention is to provide an effective and reliable system of the above-indicated character, whereby the regenerated currents of a plurality of parallel-connected dynamo-electric machines may be inherently maintained substantially constant and equal at all times throughout the regenerative period.

Heretofore, considerable difficulty has been experienced in maintaining an equalization of the regenerative currents of a plurality of parallel-connected dynamo-electric machines by reason of the unavoidable differences in the diameters of the corresponding vehicle wheels and variations in the air gaps of the various machines, etc., whereby in some cases, one machine has become damaged through heavy over-load while other machines were carrying a relatively light load.

According to my present invention, I obviate the above-mentioned difficulty by employing a motor-generator or dynamotor for all of the main field windings, so associated with the main circuits that a temporary increase of current for example, in any one armature, immediately and inherently effects a decrease in the corresponding field excitation and an increase in the field excitation of the other machines, thus maintaining a substantial equalization of all the armature currents during the regenerative period, as hereinafter more fully set forth.

In the accompanying drawing, Figure 1 is a diagrammatic view of the main circuits of a system of control embodying my invention; Fig. 2 is a diagrammatic view illustrating the arrangement of the various windings of an auxiliary dynamo-electric machine that is employed in the system shown in Fig. 1; and Fig. 3 is a diagrammatic view of a modification of Fig. 2.

Referring to Fig. 1, the system shown comprises a plurality of suitable supply-circuit conductors respectively marked Trolley and Ground; a plurality of main dynamo-electric machines respectively having armatures A1 and A2 and separately-excited heavy-wire field magnet windings F1 and F2; a motor-generator or dynamotor that is provided with a driving armature winding M, an exciting shunt field winding MF therefor, a second armature winding G that is mechanically associated with the armature M, a plurality of field windings GF1 and GF2 for the armature G that are differentially connected with respect to each other, a plurality of compensating field winding coils GC1 and GC2, and a main shunt field winding GMF; and a suitable variable resistor R for the field winding GMF.

The main field winding F1 is connected through the compensating field winding coil GC1 to a plurality of coöperating brushes 1 and 2 of the armature winding G, and the other main field winding F2 is connected through the compensating field winding coil GC2 to a second set of brushes 3 and 4 of the armature G. The sets of brushes are suitably spaced from each other, as shown more in detail in Fig. 2. The junction-point 5 of the field windings GF1 and GF2 is directly connected to the negative supply-circuit conductor Ground, and the windings GF1 and GF2 are respectively connected in series-circuit relation with the armatures A1 and A2.

In the system just described it will be observed that the main shunt field winding GMF of the armature winding G is directly connected through the resistor R across the supply circuit; but it will be understood that any other suitable disposition of the field winding may be employed if desired.

Referring now to Fig. 2, the representative structure shown comprises a suitable field yoke or frame 6 that is provided with a pair of radially inwardly-extending coöperating main polar projections 7 and 8 around which is disposed the main or exciting field winding GMF, in accordance with customary practice, and a pair of suitable interpolar projections 9 and 10 that are disposed 90 electrical degrees apart from the polar projections 7 and 8, as will be understood, the axis of the interpolar projections extending substantially midway between the pairs of adjacent non-corresponding brushes 1 and 4, and 2 and 3. The compensating field winding coils GC1 and GC2 are respectively wound upon the interpolar projections 9 and 10, while each of the interpolar projections is provided with an additional field winding that is divided into two portions, one of which constitutes a part of the field winding GF1 and the other a part of the field winding GF2, the cooperating halves of each of these field windings being disposed upon the respective interpolar projections.

Let it be assumed that the armature winding G is rotating in the direction indicated by the arrow and that the main polar projection 7 constitutes the north pole of magnetism while the polar projection 8 constitutes the south pole, as indicated by the characters N and S, respectively. It will be understood that the function of the compensating field winding coils GC1 and GC2 is to effectively neutralize the armature reaction of the armature winding G, so that normally no flux will pass from either of the interpolar projections to the armature or vice versa, the flux produced by the armature reaction being substantially totally compensated for by the opposing interpolar projection flux. However, in accordance with well-known practice relative to generating machines, the winding GC1 on the leading polar projection is adapted to produce a south or negative pole, while the trailing interpolar projection 10 will tend to be of north or positive polarity, as indicated by the characters S' and N'.

Assuming that the illustrated circuits are traversed during regenerative operation by currents in the directions indicated by the corresponding arrows, the inherent regulating operation of the system may be set forth as follows:

Under conditions of equal division of regenerative load, the currents in the field windings GF1 and GF2 are substantially equal and neutralize each other. If the current in the main armature A2, for example, momentarily increases, the energization of the differentially-related field winding GF2 is correspondingly increased to thereby effect a reduction of the voltage produced across the set of brushes 3 and 4 and to accordingly raise the voltage delivered by the set of brushes 1 and 2. Such action follows from the obvious fact that one direction of the flux created by the differentially-acting field windings GF1 and GF2 increases the electromotive force produced at one allied pair of brushes and decreases that at the other pair of brushes, while the other direction of such flux produces the opposite effect.

In this way, the voltage impressed upon the field winding F2 is decreased upon an incipient increase of regenerated current in the armature A2, whereby such armature current is maintained substantially constant and equal to that of the armature A1. The inherent compensating or balancing action just described occurs at a relatively rapid rate, since not only is the energization of the field winding F2 decreased, in the case assumed, but the excitation of the other main field winding F1 is correspondingly increased, whereby a readjustment and equalization of regenerative conditions in the two main armatures is quickly effected.

It will be understood that in case of a momentary decrease of the regenerated current in the armature A2 or the equivalent effect of a temporary increase in the other main armature A1, the reverse action of that just described will occur, whereby the voltage across the brushes 3 and 4 will be increased while the electro-motive force delivered by the brushes 1 and 2 will be correspondingly decreased.

Reference may now be had to Fig. 3, wherein the dynamo-electric machine shown differs from that illustrated in Fig. 2 only in the substitution of an interpolar projection 11 for the corresponding projection 10 and in the connecting of the field windings GMF1 and GMF2 in series relation with the field windings F1 and F2. The polar face 12 of the projection 11 is adapted to cover the brushes 2 and 4 for commutating purposes, and the projection carries two compensating coils GC3 and GC4, which correspond to the above-described windings GC1 and GC2. Windings GF3 and GF4, corresponding to the previously-mentioned windings GF1 and GF2 are disposed on the interpolar projection 9 only. The main polar projections 17 and 18 are respectively provided with series-type field windings GMF1 and GMF2. The winding GMF1 is connected in series-circuit relation with the field winding F1 of one of the main dynamo-electric machines and the compensating coil GC3 across the brushes 1 and 2 of the armature winding G, while the winding GMF2 is similarly connected to the field winding F2 and the compensating coil GC4 across the brushes 3 and 4.

The interpolar projection 11 is thus of permanent positive polarity, as indicated by the character N', while the opposite projection 19 may be of either polarity or may be neutral, dependent upon the relative energization of the field windings GF3 and GF4, as will be understood. By reason of the fact that the fluxes from polar projections 17 and 11 cumulatively thread the armature coils (not shown) that are connected to the brushes 3 and 4, while these fluxes differentially link the armature coils (not shown) that are associated with the brushes 1 and 2, the voltage delivered by the brushes 3 and 4 is at all times greater by a predetermined fixed ratio than the voltage obtaining across the brushes 1 and 2. To compensate for this difference of voltages, a resistor R1 of proper fixed value is connected in the field winding circuit that includes the brushes 3 and 4, whereby the voltages impressed upon the field windings F1 and F2 will be substantially equal whenever the currents traversing the field windings GF3 and GF4, that is to say, the currents traversing the armatures A1 and A2 of the main dynamo-electric machines, are equal; and any relative variation of such currents will effect a proportional change in the excitation of the field windings F1 and F2 throughout regenerative operation.

The general regulating action of the armature winding G for maintaining a substantially equal division of load between the main dynamo-electric machines is similar to that described in connection with the machine shown in Fig. 2, and no further exposition thereof is deemed necessary. However, it will be appreciated that by reason of the series connection of the field windings GMF1 and GMF2 with the field windings F1 and F2, respectively, the action of the machine shown in Fig. 3 will be somewhat more sensitive and accurate than the operation of the machine illustrated in Fig. 2.

Obviously, various modifications of the circuit connections and arrangement of parts herein set forth may be made without departing from the spirit and scope of my invention, and I desire, therefore, that only such limitations shall be imposed as are indicated in the appended claims.

I claim as my invention:

1. In a system of control, the combination with a plurality of main dynamo-electric machines severally having armatures and field magnet windings, of an auxiliary exciting machine armature for all of said field windings, and a plurality of differentially-connected field windings for said exciting armature respectively energized from the main armatures.

2. In a system of control, the combination with a plurality of main dynamo-electric machines severally having armatures and field magnet windings, of an auxiliary exciting machine armature having a plurality of spaced sets of brushes, and a plurality of differentially-connected field windings for said exciting armature respectively energized from the main armatures.

3. In a system of control, the combination with a supply circuit and a plurality of main dynamo-electric machines severally having armatures and field magnet windings, of an auxiliary exciting machine armature having a plurality of spaced sets of brushes, means for connecting the several sets of brushes to the respective field windings, and a plurality of differentially-connected field windings for said exciting armature respectively energized from the main armatures.

4. A system of control comprising a supply circuit, a plurality of main dynamo-electric machines severally having armatures and field magnet windings, an auxiliary exciting machine having an armature provided with a plurality of spaced sets of brushes and a plurality of differentially-connected field windings having their axis disposed substantially midway between pairs of non-corresponding brushes, means for connecting the several sets of brushes to the respective main field windings, and means for connecting said differentially-connected field windings in circuit with the respective main armatures.

5. A system of control comprising a supply circuit, a plurality of main dynamo-electric machines severally having armatures and field magnet windings, an auxiliary exciting machine having an armature provided with a plurality of spaced sets of brushes, a plurality of differentially-connected field windings having their axis disposed substantially midway between pairs of non-corresponding brushes, a compensating field winding disposed along said axis, an exciting field winding having its axis disposed ninety electrical degrees from said first axis, means for connecting the several sets of brushes in circuit with the respective main field windings, means for connecting said differentially-connected field windings in circuit with the respective main armatures, and means for connecting the coils of said compensating winding in circuit with the respective main field windings, whereby a variation in the relative currents traversing said differentially-connected windings inherently effects a decrease of the voltage across one set of brushes and an increase of the voltage across the other set to maintain a substantial equalization of the currents traversing the respective main armatures.

6. A system of control comprising a supply circuit, a plurality of main dynamo-electric machines severally having armatures and field magnet windings, an auxiliary exciting machine comprising an armature provided with a plurality of spaced sets of brushes, a plurality of differentially-connected field windings, a plurality of compensating field winding coils and a plurality of main field winding coils, means for connecting the several sets of brushes to the field windings of the main dynamo-electric machines through a compensating winding and a main field winding coil, and means for connecting said differentially-connected field windings in circuit with the respective main armatures.

7. A system of control comprising a supply circuit, a plurality of main dynamo-electric machines severally having armatures and field magnet windings, an auxiliary exciting machine comprising an armature provided with a plurality of spaced sets of brushes, a field magnet structure embodying a plurality of main polar projections and of interpolar projections, a plurality of main field winding coils severally disposed on said main projections, a plurality of differentially-connected field windings in circuit with the respective armatures and disposed on one of said interpolar projections, and a plurality of compensating field winding coils disposed on another interpolar projection, and means for connecting the several sets of brushes to the field windings of the main dynamo-electric machines through a compensating winding and a main field winding coil.

8. In a system of control, the combination with a plurality of dynamo-electric machines severally having armatures and field magnet windings, of a single source of energy for exciting all of said field widings, and means dependent upon a change of any armature current for inherently varying the voltages of the respective field-windings oppositely without altering circuit connections, whereby the currents traversing the armatures are maintained substantially equal.

9. In a system of control, the combination with a plurality of main dynamo-electric machines severally having armatures and field magnet windings, of a single auxiliary machine armature for exciting all of said field windings, and means energized by the several main-armature currents for varying the voltages impressed upon the respective field windings, while keeping all circuits unchanged, in such manner as to maintain substantially equal regenerated currents in the main armatures.

10. In a system of control, the combination with a plurality of dynamo-electric machines severally having armatures and field magnet windings, of a single source of energy for exciting all of said field windings, and differentially-acting means operative with respect to said source upon a change of any armature current to vary the voltages of the respective field windings oppositely.

11. In a system of control, the combination with a plurality of main dynamo-electric machines severally having armatures and field magnet windings, of a single auxiliary machine armature for exciting all of said field windings, and differential means acting upon said auxiliary armature under conditions of current variation in either main armature to oppositely vary the voltages of the respective field windings and maintain substantially equal currents in the main armatures.

12. In a system of control, the combination with a plurality of main dynamo-electric machines severally having armatures and field magnet windings, of a single auxiliary machine having an armature for impressing normally balanced voltages upon the respective field windings, and means comprising an inherent action in said auxiliary machine and dependent upon an unbalancing of predetermined main-machine conditions for counteractingly unbalancing the field-winding voltages.

13. In a system of control, the combination with a plurality of main dynamo-electric machines severally having armatures and field magnet windings, of a single auxiliary machine having an armature for impressing normally equal voltages upon the respective field windings, and means comprising an inherent action in said auxiliary machine and dependent upon a difference in the main-armature currents for counteractingly effecting the field-winding voltages.

14. In a system of control, the combination with a plurality of main dynamo-electric machines severally having armatures and field magnet windings, of a single auxiliary machine armature having a plurality of spaced sets of brushes, means for connecting the several sets of brushes to the respective field windings, and means dependent upon a change of any main-armature current for inherently varying the voltages of the respective sets of brushes oppositely without altering circuit connections.

15. In a system of control, the combination with a plurality of main dynamo-electric machines severally having armatures and field magnet windings, of a single auxiliary machine armature having a plurality of spaced sets of brushes, said sets being normally of substantially equal voltage, and means dependent upon a difference in the main-armature currents for inherently producing counteracting voltage changes across the respective sets of brushes.

In testimony whereof, I have hereunto subscribed my name this 6th day of Aug., 1915.

RUDOLF E. HELLMUND.